United States Patent
Xu et al.

(10) Patent No.: US 11,952,734 B2
(45) Date of Patent: Apr. 9, 2024

(54) ECOLOGICAL REVETMENT FOR REGULATING WANDERING RIVERS

(71) Applicant: DALIAN UNIVERSITY OF TECHNOLOGY, Liaoning (CN)

(72) Inventors: Xiangzhou Xu, Liaoning (CN); Shijiao Dong, Liaoning (CN); Ying Zhao, Liaoning (CN); Hongwu Zhang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 188 days.

(21) Appl. No.: 17/768,756

(22) PCT Filed: Aug. 27, 2020

(86) PCT No.: PCT/CN2020/111717
§ 371 (c)(1),
(2) Date: Apr. 13, 2022

(87) PCT Pub. No.: WO2021/082689
PCT Pub. Date: May 6, 2021

(65) Prior Publication Data
US 2023/0203770 A1  Jun. 29, 2023

(30) Foreign Application Priority Data
Oct. 28, 2019  (CN) .......................... 201911028180.3

(51) Int. Cl.
*E02B 3/12*  (2006.01)
*A01G 9/02*  (2018.01)
(Continued)

(52) U.S. Cl.
CPC ................ *E02B 3/12* (2013.01); *A01G 9/02* (2013.01); *A01G 27/005* (2013.01); *E02D 5/30* (2013.01);
(Continued)

(58) Field of Classification Search
CPC .... E02B 3/06; E02B 3/12; A01G 9/02; A01G 27/005; E02D 5/30; E02D 2300/002; E02D 2300/0085; E02D 2600/30; E04H 17/14
See application file for complete search history.

(56) References Cited

U.S. PATENT DOCUMENTS

| 2,639,587 A * | 5/1953 | Hayden ..................... E02B 3/06 |
| | | D25/113 |
| 2,683,968 A * | 7/1954 | Budd ........................ E02B 3/06 |
| | | 256/19 |

(Continued)

FOREIGN PATENT DOCUMENTS

| CN | 1944803 A | 4/2007 |
| CN | 104594287 A | 5/2015 |

(Continued)

*Primary Examiner* — Benjamin F Fiorello
(74) *Attorney, Agent, or Firm* — Muncy, Geissler, Olds & Lowe, P.C.

(57) ABSTRACT

The invention belongs to ecological revetments in the technical field of river ecology, which particularly involves an ecological revetment to regulate wandering rivers. The ecological revetment is composed of porous concrete-piles, ecological connecting-plates, an ecological viewing-corridor and a slope green-belt. The ecological landscape-corridor and anchor rod are placed on the upper and middle parts of the pile structure, respectively. In virtue of the innovative structure, the ecological revetment will strengthen the revetment structure, reduce the revetment settlement, prevent the revetment from moving, and enhance the overall stability of the revetment project. The ecological holes exist on the ecological connecting-plates, which is beneficial to the exchange of material and energy from the river course and the bank slope, and the holes could greatly enhance the self-cleaning capacity of the water body. Not only do the (Continued)

plants on the ecological viewing-corridor provide the habitats for the organisms, but also green the revetment.

7 Claims, 4 Drawing Sheets

(51) Int. Cl.
    *A01G 27/00*     (2006.01)
    *E02D 5/30*     (2006.01)
    *E04H 17/14*     (2006.01)

(52) U.S. Cl.
    CPC ....... *E04H 17/14* (2013.01); *E02D 2300/002* (2013.01); *E02D 2300/0085* (2013.01); *E02D 2600/30* (2013.01)

(56) References Cited

U.S. PATENT DOCUMENTS

| | | | | |
|---|---|---|---|---|
| 3,373,668 | A * | 3/1968 | Moore | E01C 5/16 |
| | | | | 47/33 |
| 5,536,111 | A * | 7/1996 | Doernemann | E02B 3/06 |
| | | | | 405/21 |
| 6,932,539 | B2 * | 8/2005 | Benedict | E02B 3/04 |
| | | | | 405/35 |
| 2011/0033237 | A1 * | 2/2011 | Kanand | E02D 17/20 |
| | | | | 405/17 |
| 2015/0191888 | A1 * | 7/2015 | Karsten | E02B 3/12 |
| | | | | 405/262 |
| 2016/0194847 | A1 * | 7/2016 | Prashar | E02D 7/02 |
| | | | | 405/274 |
| 2017/0298586 | A1 * | 10/2017 | Villar | E02B 3/20 |
| 2018/0223492 | A1 * | 8/2018 | Lorenzi | E02B 9/08 |
| 2019/0145072 | A1 * | 5/2019 | Haigh | E02D 29/02 |
| | | | | 405/203 |

FOREIGN PATENT DOCUMENTS

| | | |
|---|---|---|
| CN | 105507204 A | 4/2016 |
| CN | 205530123 U | 8/2016 |
| CN | 106759093 A | 5/2017 |
| CN | 110725233 A | 1/2020 |
| KR | 100541835 B1 | 1/2006 |
| KR | 100582471 B1 | 5/2006 |

\* cited by examiner

ECOLOGICAL REVETMENT FOR REGULATING WANDERING RIVERS

TECHNICAL FIELD

The invention belongs to ecological revetments in the technical field of river ecology, which particularly involves an ecological revetment to regulate wandering rivers.

BACKGROUND

As the social economy develops, people begin to pay more attentions to the water environment, landscape and ecosystem. In order to keep the health of river ecosystem in the Yellow River Basin, Chinese government has taken the safety and stability of the revetment into consideration based on the strategy of ecological protection and high-quality development. The designer is required to emphasize the connectivity of the revetment structure influencing the survival and reproduction of organism. In this way, not only the water eco-environment but also the self-cleaning capacity of rivers will be greatly improved (Chen Zhaofang. Design on the Ecological Revetment and Landscape of the Dike in the Lower Reach of the Yellow River [J]. Green Technology, 2011, (09): 37-38).

Since 1949s, great achievements have been made in governance of the Yellow River due to years of river regulation and construction. However, because a large amount of suspended sediments have been carried in the Huayuankou-Gaocun reach of the Yellow River, a section of unstable wandering river has been formed during the long period of evolution. Here the river bed is wide and shallow, the water flow is disordered, the main stream unsteadily swings, and the river regime is changeable. The river bed is violently eroded or silted and an upward trend of accumulation exists. Deformed river regimes, such as "perched river", "transverse river" and "diagonal river", frequently appear, which greatly threaten the safety of flood control on both sides of the revetments (Yang Shilei. Study on the bank protection mechanism of spur-dike group and permeable pile dike [D]. Northwest Agriculture and Forestry University, 2014).

In order to reduce the damage on both revetments of the wandering main-stream, the revetments are anticipated to be effectively improved. Traditionally, the revetment-government is used for flood control, water delivery and river navigation. The original natural bank-slopes have to be replaced with the solid revetments made of concrete or stone to prevent the river bank from being scoured. Most of the revetments above mentioned are closed and rigid, which block the transverse connection of the rivers, cut off the exchange of material and energy between the land and the river, and reduce the self-cleaning capacity of the river. The structural revetments block the ecological cycle of the animals, plants, microorganisms and land in the river, and then some organisms in the river will lose their habitats on the bank slope. As a result, the regular revetment-projects cannot satisfy the requirements of sustainable development and ecology. Presently a new structural form of the river regulation project, the pile-styled engineering, appears based on improvement of the traditional revetment, which could control the river regime while slowing down the flow and depositing the soil nearby the piles (Shi Xingshun. Analysis of Pervious Dikes Applied in the Strengthening Project for the Inverted Siphon Transporting Water from the Shitouhe River across the Wei River [J]. Groundwater, 2015, 37(05): 176-180.). Meanwhile, the pile-styled engineering has water permeability and the engineering realizes transverse connection between land and water. However, in recent years, problems still exist, e.g. foundation settlement, collapsed pile and broken pile, due to the insufficient pile-length and unstable pile-foundation.

In the past years, solid structures, such as grouted nibbles and concrete walls, have been used in most of river-protection projects in China and other countries. However, usually the structural stability is considered in the engineering, whereas the ecological property of the revetment is ignored. Although the solid structure may maintain bank stability and control soil erosion, adverse effects will be imposed on the landscape and ecology, and deteriorations will be caused to the soil, water and land environment (Liu Yingfei. Research on the Experimental Investigation and Design of Interstitial Spaces & Inhabit Riverbank Unit [D]. Dalian University of Technology, 2007.). In the near future, the following revetment structures are anticipated in the ecological protection and high-quality development of the Yellow River Basin, which can: (1) satisfy the ecological requirements, (2) realize transverse connection of water and land, (3) maintain the biological diversity, (3) keep their own structural stability, (4) maintain bank-slope stability, (5) control the river regime, and (6) satisfy the requirements of green landscapes.

SUMMARY

To solve the problems mentioned above, the invention presents an ecological revetment suitable to regulate the wandering rivers, which can satisfy the requirements of the structure, ecology and landscape of the project. The revetment is made of a stable and permeable structure, which can prevent floods, strengthen the embankment, control the river regime, promote the silt deposition, improve the self-cleaning capacity of the river, satisfy the requirement of the landscape, achieve a good transverse connection between water and land, and solve the problem how a closed hard revetment influences the exchange of material and energy in the water environment and ecosystem.

The technical solution of the invention is shown as follows:

An ecological revetment to regulate wandering rivers is presented here, wherein the revetment is composed of porous concrete-piles 1, ecological connecting-plates 2, an ecological viewing-corridor 3 and a sloping green-belt 4; the bottoms of the porous concrete-piles 1 are fixed in the soil of a river bank slope; the middle parts and lower parts of the pile are located below a water surface, while the upper parts are located above the water surface; the ecological connecting-plates 2 are fixed in the middle parts of the porous concrete-piles 1; the ecological connecting-plates 2 are located between two adjacent porous concrete-piles 1, and the plates are also submerged below the water surface; the ecological viewing-corridor 3 is fixed on the top of the porous concrete-piles 1; a sloping green-belt 4 is arranged in parallel with the ecological viewing-corridor 3, and the sloping green-belt 4 is located on the river bank slope; each porous concrete-pile 1 is a precast pile with a T-shaped section; two upper wings of the porous concrete-pile 1 comprise a convex wing on one side and a concave wing on another side; the concave and convex wings of two adjacent porous concrete-piles 1 are merged together, and then poured with cement; some inserting ears 1-1 are provided on the top of the porous concrete-pile 1, and some longitudinal and transverse hanging ears 1-2 are also furnished on both sides of the middle parts; each ecological connecting-plate 2 has a prefabricated plate-like structure, and the plate is mainly composed of a front inserting-plate 2-2, several middle transverse inserting-plates 2-4 and a rear inserting-plate 2-5; both sides of the front inserting-plate 2-2 and rear inserting-plate 2-5 are connected with the longitudinal hanging-ears 1-2 of the porous concrete-piles 1; both ends of the middle transverse inserting-plates 2-4 are inserted into the transverse hanging ears 1-2 of the porous concrete-piles 1; a plurality of middle transverse inserting-plates 2-4, which are located between the front inserting-plate 2-2 and rear inserting-plate 2-5, are parallelly arranged from the top to bottom of the revetment; the inserting-plates are fixed with pouring cement; the longitudinal section of the front inserting-plate 2-2 is curved, and so is the rear inserting-plate 2-5; a plurality of ecological holes 2-1 with different sizes exist in the front inserting-plate 2-2, rear inserting-plate 2-5, and middle transverse inserting-plates 2-4; a transverse anchor-rod 2-3 is arranged on the rear inserting-plate 2-5; the whole structure is fixed on the bank slope with an anchor rod 2-3;

the ecological viewing-corridor 3 is mainly composed of a bottom plate 8, an ecological guardrail and abundant green plants; the bottom plate 8 has a plate-like structure; a plurality of inner grooves 8-1 exist on the lower surface of the bottom plate 8; the inserting ears 1-1 on the tops of the porous concrete-piles 1 are inserted into the inner grooves 8-1; some grooves 8-2 are reserved on the upper surface of the bottom plate 8 facing the river to prevent the revetment from moving and keep the porous concrete-piles 1 from sinking.

the ecological guardrail comprises connecting pieces 5, outer board-grooves 6 and railings 7; a plurality of outer board-grooves 6 are arranged in a row and placed in the groove 8-2; adjacent outer board-grooves 6 are connected with the connecting pieces 5; two railings 7 are located at the outermost end of the ecological guardrail, and the bottoms are fixed on the bottom plate 8; the railings 7 and outer board-grooves 6 are connected with the connecting pieces 5 to form a guardrail; water-storage tanks 6-1, planting tanks 6-3 and automatic spray-pipes 6-6 are arranged in the outer board-grooves 6; the water-storage tanks 6-1 are placed at the bottoms of the outer board-tanks 6, while the planting tanks 6-3 are placed above the water-storage tanks 6-1; the upper parts of the water-storage tanks 6-1 are provided with overflow holes 6-5, and excess water can flow into gaps between shells of the outer board tanks 6 and water-storage tanks 6-1; the bottoms of the planting tanks 6-3 are permeable plates 6-4; the anti-filter geotextile is laid on the permeable plates 6-4; the permeable plates 6-4 are provided with a plurality of water-leakage holes 6-2, so that the excess water in the planting tanks 6-3 flows into the water-storage tanks 6-1; the automatic spray-pipes 6-6 are inserted into the water-storage tanks 6-1 to provide water sources for the planting tanks 6-3;

the sloping green-belt 4, a combination of various plants, is located at the side of the ecological viewing-corridor away from the river 3.

The advantages and positive effects of the invention are shown as follows: the invention is suitable for the wandering rivers, which can stabilize the river regime, promote sediment deposition, conserve water and soil, reduce the flow rate of the river, avoid scouring the bank by torrent and wave, and maintain stability of the bank slope. The ecological landscape-corridor and anchor rod are placed on the upper and middle parts of the pile structure, respectively. In virtue of the innovative structure, the ecological revetment will strengthen the revetment structure, reduce the revetment settlement, prevent the revetment from moving, enhance the overall stability of the revetment project, and subsequently better adapt to the wandering rivers. Due their permeability, the porous concrete-piles and the perforated ecological connecting-plates in the invention are beneficial to the exchange of material and energy from the river course and the bank slope, and the holes will greatly enhance the self-cleaning capacity of the water body. The ecological holes of the ecological connecting-plates provide channels and habitats for river organisms. The ecological holes are arranged along different directions so as to adapt to the wandering rivers, reduce the fluent energy and slow down the sediment deposition. Not only do the plants on the ecological viewing-corridor provide the habitats for the organisms, but also green the revetment. Moreover, the flowerbeds on the ecological viewing-corridor may store enough water for irrigation and ensure the ecological characteristics of the revetment.

Components shown in the figures: 1 porous concrete-pile, 1-1 inserting ear, 1-2 hanging ear, 2 ecological connecting-plate, 2-1 ecological hole, 2-2 front inserting-plate, 2-3 anchor rod, 2-4 middle transverse inserting-plate, 2-5 rear inserting-plate, 3 ecological viewing-corridor, 4 sloping green-belt, 5 connecting piece, 6 outer board-groove, 6-1 water-storage tank, 6-2 water-leakage hole, 6-3 planting tank, 6-4 permeable plate, 6-5 overflow hole, 6-6 automatic spray-pipes, 7 railing, 8 bottom plate, 8-1 inner groove, and 8-2 groove.

DETAILED DESCRIPTION

The invention will be further illustrated in combination with the case studies and description figures.

Figure 1:
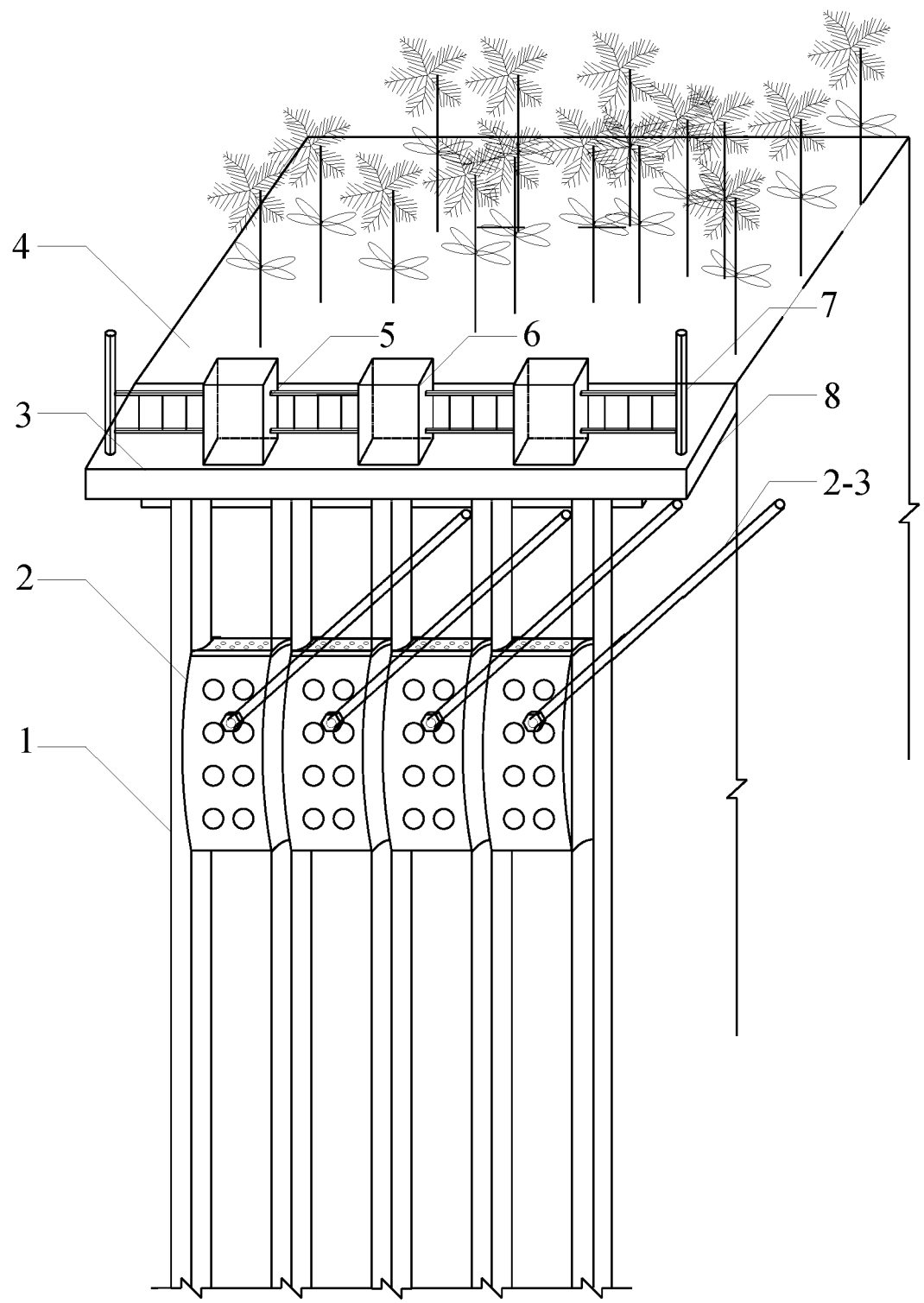
FIG. 1 shows the schematic structure of an ecological revetment to regulate wandering rivers in the invention.
Figure 2:
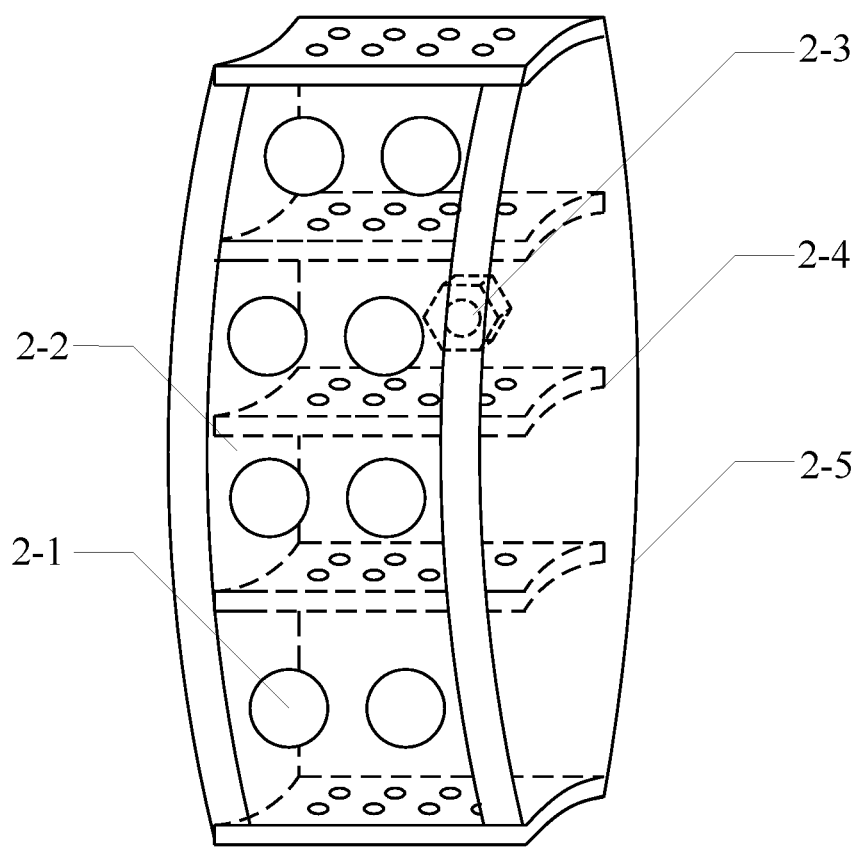
FIG. 2 is the schematic structure of an ecological connecting-plate.
Figure 3:
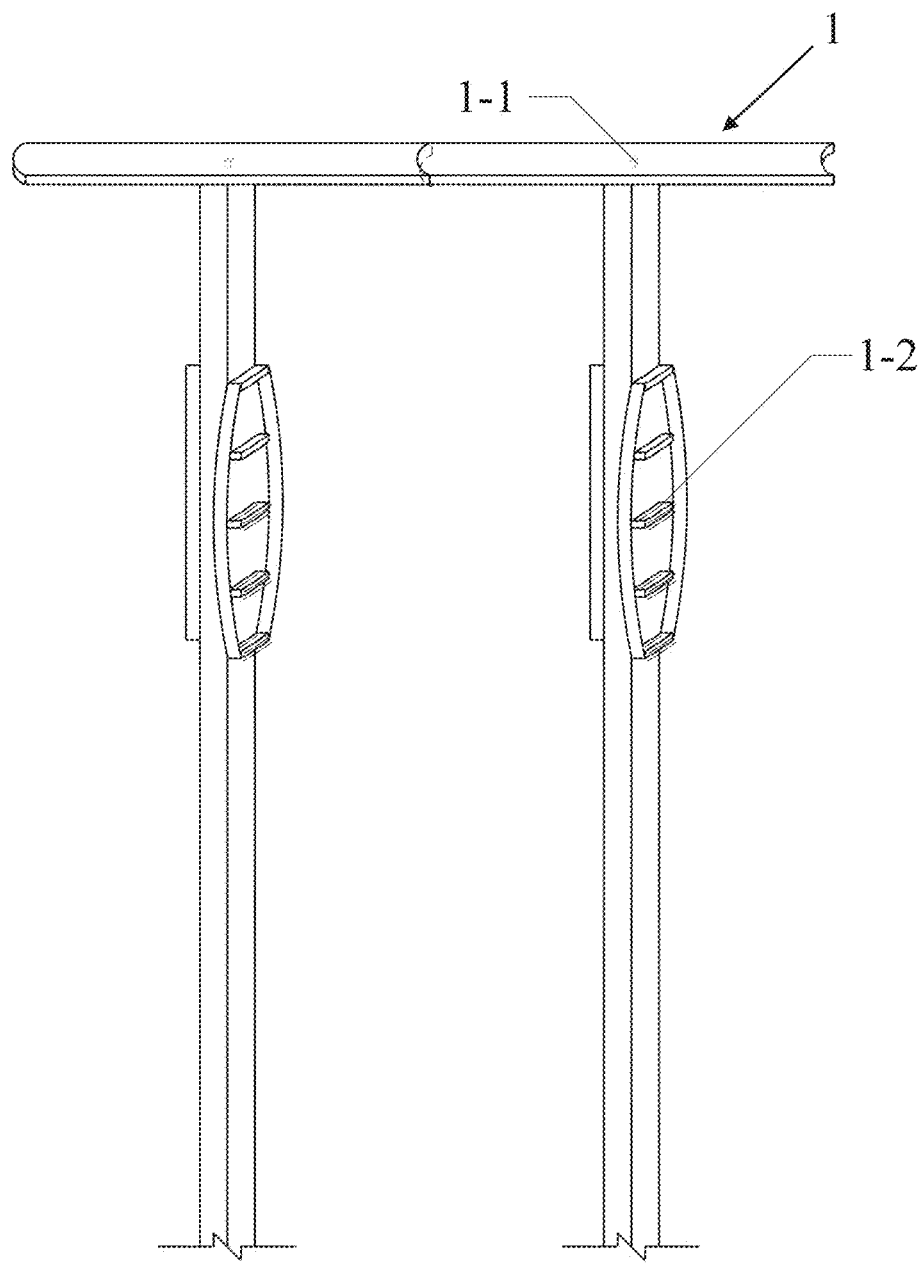
FIG. 3 shows the schematic structure of a porous concrete pile.
Figure 4:
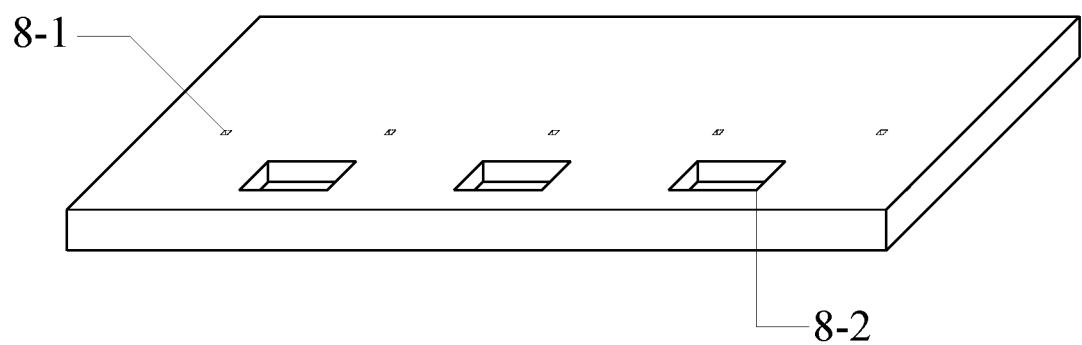
FIG. 4 is the schematic structure of a bottom plate for the ecological viewing-corridor.
Figure 5:
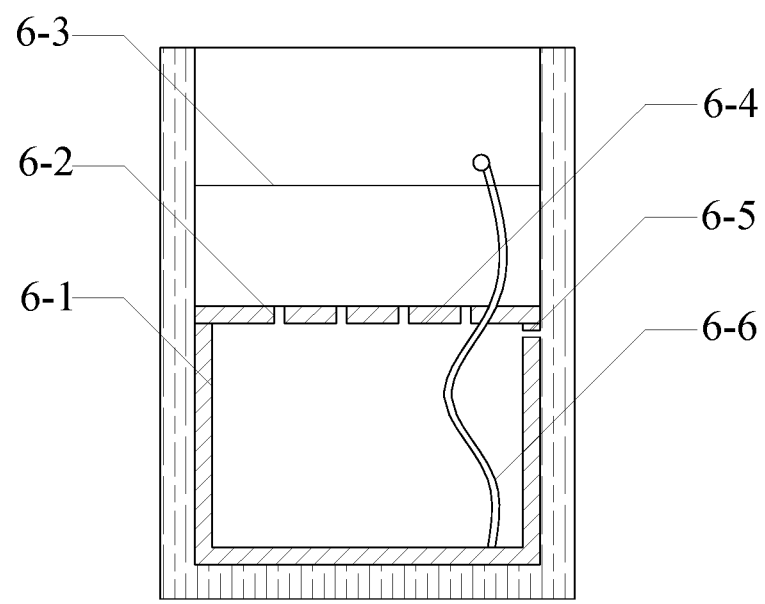
FIG. 5 is a longitudinal section of the outer board-groove.

As shown in FIGS. 1-5, an ecological revetment to regulate wandering rivers comprises porous concrete-piles 1, ecological connecting-plates 2, an ecological viewing-corridor 3 and a slope green belt 4.

Each porous concrete-pile 1 is a precast pile with a T-shaped section; a T-shaped wing plate comprises a convex wing on one side and a concave wing on another side; the concave wing and the convex wing are merged together and then poured with cement, so that the piles are arranged on the same horizontal line to enhance the stability of the pile. The inserting ears 1-1 on the top of the T-shaped wing plate are inserted into the inner grooves 8-1 of a bottom plate. The longitudinal and transverse hanging ears 1-2 are placed on both sides of the porous concrete-piles 1.

The ecological connecting-plates 2 are set on the middle parts of the porous concrete-piles 1. Each ecological connecting-plate 2 has a prefabricated plate-like structure made of pervious concrete. The ecological connecting-plate 2 mainly comprises a front inserting-plate 2-2, middle transverse inserting-plates 2-4 and a rear inserting-plate 2-5. The middle transverse inserting-plates 2-4 are transversely inserted into the hanging ears 1-2 on both sides of the porous concrete-piles 1; the front inserting-plate 2-2 and the rear inserting-plate 2-5 are longitudinally inserted into the hanging ears 1-2 on both sides of the porous concrete-piles 1. Then, the components connected together will be poured with cement to reinforce the strength of the revetment structure and enhance the stability of the revetment project. The anchor rod 2-3 is arranged on the rear inserting-plate 2-5 and fixed on the bank slope to reduce the revetment settlement, prevent the revetment from moving, enhance the overall stability of the revetment project, and subsequently better adapt to the wandering rivers. The ecological holes 2-1 with different sizes and shapes, e.g. circle, rhombus or hexagon, exist on the ecological connecting-plates 2. The ecological holes 2-1 may provide shelters for fish and spiral shells to avoid predators. The ecological holes 2-1 are arranged along different directions to adapt to the wandering rivers, so as to weaken the water flow, stabilize the river regimes, reduce the flow velocity and reduce the energy. The longitudinal sections of the front and rear inserting-plates are curved, so as to reduce the energy, decrease the revetment settlement and enhance the structure stability. The ecological holes 2-1 may provide channels, habitats and shelters for river organisms. Furthermore, the ecological holes 2-1 may filter the silt, and the hole may also give ways for small organisms to avoid enemies. Plants such as algae and moss are planted on the middle transverse inserting-plates 2-4, which are convenient for fish and insects to lay eggs and lead lives.

The ecological viewing-corridor 3 is arranged on the top of the porous concrete-piles 1. The ecological viewing-corridor 3 comprises a bottom plate 8, an ecological guardrail and plentiful green viewing-plants. The bottom plate 8 has a plate-like structure. The inserting ears 1-1 on the lower surface of the bottom plate 8 are inserted into the inner grooves 8-1 to reinforce the revetment structure and improve the overall stability of the revetment project. The revetment is easy and rapid to construct.

The ecological guardrail comprises connecting pieces 5, outer board-grooves 6, railings 7, water-storage tanks 6-1, water-leakage holes 6-2, planting tanks 6-3 and automatic spray-pipes 6-6. The outer board-grooves 6 are placed in the grooves 8-2, and the planting tanks 6-3 and water-storage tanks 6-1 are placed in the outer board-grooves 6. The permeable plates 6-4 are located at the bottoms of the planting tanks 6-3. The anti-filter geotextile is laid on the permeable plates 6-4, the planting tanks 6-3 are on the upper part, and the water-storage tanks 6-1 are on the lower part. The overflow holes 6-5 are set on the upper parts of the water-storage tanks 6-1. When water level in the water-storage tanks 6-1 exceeds the overflow holes, excess water may flow out along the overflow holes 6-5. The plant are easy to irrigate and maintain, and water is convenient to store and supply, because the bottoms and tops of the automatic spray-pipes 6-6 are located in the water-storage tanks 6-1 and planting tanks 6-3, respectively. The ecological viewing-corridor 3 meets the requirements of ecology and landscape.

The sloping green-belt 4 is a combination of multiple plants, which meets the principles of biodiversity, ecology and landscape. Also the plants in the belt should match with local climate, landform and geology. As a result, the belt will have the functions of water retention, soil conservation and slope greening.

The porous concrete-piles 1 in the invention are arranged at a certain interval, and the buried depth is determined according to the actual situation of the bank slope. The porous concrete-piles 1 and perforated ecological connecting-plates 2 here are beneficial to the exchange of material and energy from the river course and bank slope, and the holes will greatly enhance the self-cleaning capacity of the water body.

The invention claimed is:

1. An ecological revetment to regulate wandering rivers, wherein the revetment is composed of porous concrete-piles, ecological connecting-plates, an ecological viewing corridor and a sloping green-belt; the bottoms of the porous concrete-piles are fixed in the soil of a river bank slope; the middle parts and lower parts of the pile are located below a water surface, while the upper parts are located above the water surface; the ecological connecting-plates are fixed in the middle parts of the porous concrete-piles; the ecological connecting-plates are located between two adjacent porous concrete-piles, and the plates are also submerged below the water surface; the ecological viewing corridor is fixed on the top of the porous concrete-piles; the sloping green-belt is arranged in parallel with the ecological viewing corridor, and the sloping green-belt is located on the river bank slope;

each porous concrete-pile is a precast pile with a T-shaped section; two upper wings of the porous concrete-pile comprise a convex wing on one side and a concave wing on another side; the concave and convex wings of two adjacent porous concrete-piles are merged together; inserting ears are provided on the top of the porous concrete-pile, and longitudinal and transverse hanging ears are furnished on sides of the middle part of the porous concrete-pile;

each ecological connecting-plate has a prefabricated plate-like structure, and the plate is mainly composed of a front inserting-plate, several middle transverse inserting-plates and a rear inserting-plate; both sides of the front inserting-plate and rear inserting-plate are connected with the longitudinal hanging-ears of the porous concrete-piles; both ends of the middle transverse inserting-plates are inserted into the transverse hanging ears of the porous concrete-piles; a plurality of middle transverse inserting-plates, which are located between the front inserting-plate and rear inserting-plate, are parallelly arranged from the top to bottom of the revetment; the inserting-plates are fixed with pouring cement; the longitudinal section of the front inserting-plate is curved, and so is the rear inserting-plate; a plurality of ecological holes with different sizes exist in the front inserting-plate, rear inserting-plate, and middle transverse inserting-plates; a transverse anchor-rod is arranged on the rear inserting-plate; the whole structure is fixed on the bank slope with an anchor rod;

the ecological viewing corridor is mainly composed of a bottom plate, an ecological guardrail and green plants; the bottom plate has a plate-like structure; a plurality of inner grooves exist on the lower surface of the bottom plate; the inserting ears on the tops of the porous concrete-piles are inserted into the inner grooves; some grooves are reserved on the upper surface of the bottom plate facing the river;

the ecological guardrail comprises connecting pieces, outer board-grooves and railings; a plurality of outer board-grooves are arranged in a row and placed in the groove; adjacent outer board-grooves are connected with the connecting pieces; two railings are located at the outermost end of the ecological guardrail, and the bottoms are fixed on the bottom plate; the railings and outer board-grooves are connected with the connecting pieces to form a guardrail; water-storage tanks, planting tanks and automatic spray-pipes are arranged in the outer board-grooves; the water-storage tanks are placed at the bottoms of the outer board-tanks, while the planting tanks are placed above the water-storage tanks; the upper parts of the water-storage tanks are provided with overflow holes, and excess water can flow into gaps between shells of the outer board tanks and water-storage tanks; the bottoms of the planting tanks are permeable plates; an anti-filter geotextile is laid on the permeable plates; the permeable plates are provided with a plurality of water-leakage holes, so that the excess water in the planting tanks flows into the water-storage tanks; the automatic spray-pipes are inserted into the water-storage tanks to provide water sources for the planting tanks;

the sloping green-belt, a combination of various plants, is located at the side of the ecological viewing corridor away from the river.

2. The ecological revetment to regulate the wandering rivers according to claim 1, wherein the porous concrete-piles, the ecological connecting-plates and the bottom plate are made of pervious concrete.

3. The ecological revetment to regulate wandering rivers according to claim 2, wherein plants are planted on the middle transverse inserting-plates, the plants are algae and moss.

4. The ecological revetment to regulate wandering rivers according to claim 2, wherein the shapes of the ecological holes are round, rhombus or hexagon, and are arranged along different directions.

5. The ecological revetment to regulate wandering rivers according to claim 1, wherein the shapes of the ecological holes are round, rhombus or hexagon, and are arranged along different directions.

6. The ecological revetment to regulate wandering rivers according to claim 5, wherein plants are planted on the middle transverse inserting-plates, the plants are algae and moss.

7. The ecological revetment to regulate wandering rivers according to claim 1, wherein plants are planted on the middle transverse inserting-plates, the plants are algae and moss.

* * * * *